(12) United States Patent
Matsumoto

(10) Patent No.: US 11,348,271 B2
(45) Date of Patent: May 31, 2022

(54) IMAGE PROCESSING DEVICE AND THREE-DIMENSIONAL MEASURING SYSTEM

(71) Applicant: OMRON Corporation, Kyoto (JP)

(72) Inventor: Shinya Matsumoto, Osaka (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/272,918

(22) PCT Filed: Mar. 14, 2019

(86) PCT No.: PCT/JP2019/010582
§ 371 (c)(1),
(2) Date: Mar. 2, 2021

(87) PCT Pub. No.: WO2020/183710
PCT Pub. Date: Sep. 17, 2020

(65) Prior Publication Data
US 2022/0012905 A1    Jan. 13, 2022

(51) Int. Cl.
*G06T 7/593* (2017.01)
*H04N 13/00* (2018.01)
*G06T 7/521* (2017.01)

(52) U.S. Cl.
CPC .......... *G06T 7/593* (2017.01); *G06T 2200/08* (2013.01); *H04N 2013/0081* (2013.01)

(58) Field of Classification Search
CPC ..... G06T 7/593; G06T 7/521; G06T 2200/08; G06T 2207/10012; G06T 2207/10028; G06T 2207/20016; H04N 2013/0081
See application file for complete search history.

(56) References Cited

U.S. PATENT DOCUMENTS 6,055,012 A  *  4/2000  Haskell ................. H04N 19/82
                                            348/E13.058
2010/0328427 A1   12/2010  Sakano
(Continued)

FOREIGN PATENT DOCUMENTS

EP    3343500 A1    7/2018
JP    2011013706 A    1/2011
(Continued)

OTHER PUBLICATIONS

International Search Report issued in Intl. Appln. No. PCT/JP2019/010582 dated May 28, 2019. English translation provided.
(Continued)

*Primary Examiner* — Matthew K Kwan
(74) *Attorney, Agent, or Firm* — Rossi, Kimms & McDowell LLP

(57) ABSTRACT

An image processing device includes a disparity estimating unit configured to estimate a disparity between the first image and the second image based on a method different from stereo matching, a transforming unit configured to perform transformation processing on both the first image and the second image to reduce the number of pixels in the horizontal direction and/or the vertical direction, a setting unit configured to set, based on the disparity thus estimated, a search range for a corresponding point for the stereo matching, and a search unit configured to search only the search range thus set for a corresponding point of each pixel between the first image subjected to the transformation processing and the second image subjected to the transformation processing.

9 Claims, 11 Drawing Sheets

(56) References Cited

U.S. PATENT DOCUMENTS

| | | | |
|---|---|---|---|
| 2012/0257016 A1 | 10/2012 | Nakajima | |
| 2014/0153816 A1 | 6/2014 | Cohen | |
| 2015/0178936 A1* | 6/2015 | Boisson | G06T 7/593 |
| | | | 382/154 |
| 2018/0189975 A1* | 7/2018 | Inada | G01C 3/08 |

FOREIGN PATENT DOCUMENTS

| | | |
|---|---|---|
| JP | 2012248221 A | 12/2012 |
| JP | 2017045283 A | 3/2017 |

OTHER PUBLICATIONS

Written Opinion issued in Intl. Appln. No. PCT/JP2019/010582 dated May 28, 2019. English translation provided.

Vuylsteke. "Range Image Acquisition with a Single Binary-Encoded Light Pattern." IEEE Transactions on Pattern Analysis and Machine Intelligence. Feb. 1990: 148-164. vol. 12, No. 2. Cited in Specification.

Extended European Search Report issued in European Appln. No. 19918794.9 dated Feb. 8, 2022.

Um. "Depth map-based disparity estimation technique using multi-view and depth camera.", Proceedings of SPIE. Jan. 2006: 60551E-1-60551E-10. vol. 6055, No. 27.

Liu. "Optimized stereo matching in binocular three-dimensional measurement system using structured light.", Applied Optics. Optical Society of America. Sep. 10, 2014: 6083-6090. vol. 53, No. 26.

Wei. "Disparity search range estimation based on TOF-stereo fusion.", Proceedings of SPIE. The International Conference on Photonics and Optical Engineering (icPOE 2014). IEEE. Feb. 19, 2015: 94490R-1-94490R-6. vol. 9449.

* cited by examiner

IMAGE PROCESSING DEVICE AND THREE-DIMENSIONAL MEASURING SYSTEM

TECHNICAL FIELD

The present invention relates to three-dimensional measurement using an image.

BACKGROUND ART

Various methods for three-dimensional measurement of an object are known in the related art, and such methods are broadly classified, based on properties of light, into a method based on the rectilinear propagation property of light and a method based on the speed of light. Of the methods, the method based on the rectilinear propagation property of light includes methods classified into an active measuring (active measurement type) method or a passive measuring (passive measurement type) method, and the method based on the speed of light includes methods classified into the active measuring (active measurement type) method.

Non-Patent Document 1 discloses, as a specific example of a space-coded pattern projection method, an example of the active measuring method, a method for obtaining a three-dimensional shape by projecting space-coded pattern illumination to an object and analyzing a taken image of the object onto which the pattern has been projected.

Further, as an example of the passive measuring method, so-called stereo matching (also referred to as stereo vision) for measuring a three-dimensional shape of an object based on two images taken from different viewpoints is known (see Patent Document 1). FIG. 11 shows the principle of stereo matching. In stereo matching, for example, two cameras arranged side by side concurrently take an image of an object O to obtain two images. With one of the two images denoted as a reference image I1 and the other denoted as a comparison image I2, a pixel (corresponding point P2) that is most similar in image feature to a pixel (reference point P1) in the reference image I1 is searched for along an epipolar line E in the comparison image I2, and a difference in coordinates (disparity) between the reference point P1 and the corresponding point P2 is obtained. A geometrical position of each camera is known, so that a distance D (depth) in a depth direction can be calculated from the disparity based on the principle of triangulation, thereby allowing a three-dimensional shape of the object O to be restored.

PRIOR ART DOCUMENTS

Patent Document

Patent Document 1: Japanese Unexamined Patent Publication No. 2012-248221

Non-Patent Document

Non-Patent Document 1: P. Vuylsteke and A. Oosterlinck, Range Image Acquisition with a Single Binary-Encoded Light Pattern, IEEE PAMI 12 (2), pp. 148-164, 1990.

SUMMARY OF THE INVENTION

Problems to be Solved by the Invention

The use of a high-resolution camera allows stereo matching to increase measurement accuracy and to also increase the number of measurement points (pixels for which the corresponding points have been found and the distance information has been successfully obtained) and the spatial resolution. On the other hand, however, as the number of pixels of the input image captured from the camera increases, the time required for the corresponding point search becomes longer, and the measurement time remarkably increases. Further, as the number of measurement point groups increases, the start timing of subsequent processing (for example, object recognition or shape recognition) is restricted by the transfer time of the measurement point group data, or the computational complexity of subsequent processing increases, which may cause a delay in processing of the entire system. In particular, in the fields of robot vision or machine vision, there is a strong demand for real-time processing, and a reduction in measurement time and data transfer time is one of the important practical technical issues. However, it is undesirable to give priority to an increase in processing speed and simply use a low-resolution image because it causes deterioration in measurement accuracy and reliability.

The present invention has been made in view of the above-described circumstances, and it is therefore an object of the present invention to provide a technique for enabling measurement processing based on stereo matching with both high accuracy and high speed.

Means for Solving the Problem

Provided according to an aspect of the present invention is an image processing device configured to generate a depth map based on stereo matching using an image pair, the depth map corresponding to data containing coordinates of each pixel and distance information, the coordinates of each pixel and the distance information being associated with each other, the image processing device including an image capture unit configured to capture a first image and a second image, the first image and the second image being taken from different viewpoints, a disparity estimating unit configured to estimate a disparity between the first image and the second image based on a method different from the stereo matching, a transforming unit configured to perform transformation processing on both the first image and the second image to reduce the number of pixels in a horizontal direction and/or a vertical direction, a setting unit configured to set, based on the disparity estimated, a search range for a corresponding point for the stereo matching, a disparity map generating unit configured to search only the search range set for a corresponding point of each pixel between the first image subjected to the transformation processing and the second image subjected to the transformation processing and generate a disparity map based on a result of the search, the disparity map corresponding to data containing the coordinates of each pixel and disparity information, the coordinates of each pixel and the disparity information being associated with each other, and a depth map generating unit configured to transform the disparity information of the disparity map into the distance information and generate the depth map.

According to the above-described configuration, an image having the number of pixels reduced is used for the stereo matching, and the search range of a corresponding point is narrowed based on the estimated disparity. This allows a significant reduction in time required for the corresponding point search as compared with the typical stereo matching known in the related art. This further allows a reduction in the number of data points (data volume) of the depth map that is a result of the stereo matching, thereby producing an effect of reducing the data transfer time and reducing the subsequent processing time. In addition, according to the above-described configuration, the search range (that is, a range having a greater probability that a corresponding point exists) is narrowed based on the estimated disparity, thereby allowing an increase in processing speed while suppressing reductions in accuracy and reliability of the corresponding point search.

The transforming unit may reduce the number of pixels of both the first image and the second image in both the horizontal direction and the vertical direction. This is because the time required for the corresponding point search can be shortened as much as possible by reducing the number of pixels in both the directions before the corresponding point search processing.

A second transforming unit may be further provided, the second transforming unit being configured to perform second transformation processing on the disparity map generated by the disparity map generating unit to reduce the number of pixels in the horizontal direction or the vertical direction. According to this configuration, the transforming unit may perform the transformation processing on both the first image and the second image to reduce the number of pixels in one direction of the horizontal direction or the vertical direction, the second transforming unit may perform the second transformation processing on the disparity map to reduce the number of pixels in a direction different from the one direction applied to the transformation processing, and the depth map generating unit may generate the depth map from the disparity map subjected to the second transformation processing. As described above, the use of the image having the number of pixels reduced in only the one direction allows a reduction in time required for the corresponding point search as compared with a conventional case (a case where the number of pixels is not reduced) and an increase in reliability of the corresponding point search as compared with a case where the number of pixels is reduced in both the directions. That is, it is possible to achieve processing with high speed and reliability well-balanced.

The one direction may be orthogonal to an epipolar line. Corresponding points exist on the epipolar line. Therefore, when the corresponding point search is performed in a state where the number of pixels in a direction parallel to the epipolar line is not reduced (that is, the amount of information in the direction parallel to the epipolar line is maintained), it is possible to relatively maintain the accuracy and reliability of the corresponding point search.

The transformation processing may be processing of thinning out the pixels. This is because the processing is simple and fast. This is because the thinning processing does not produce any artifacts that adversely affect the corresponding point search.

The disparity estimating unit may estimate the disparity based on distance information obtained based on a space-coded pattern projection method as the method different from the stereo matching. This is because the space-coded pattern projection method allows the distance information to be obtained in a much shorter processing time than the stereo matching. Note that although the space-coded pattern projection method is lower in spatial resolution of distance measurement than the stereo matching method, it can be said that it is necessary and sufficient for the disparity estimation.

According to this configuration, the first image and the second image may be taken by imaging projected pattern illumination for the space-coded pattern projection method, and the disparity estimating unit may estimate the disparity based on the distance information obtained based on the space-coded pattern projection method using the first image or the second image. Making the image used for the stereo matching identical to the image used for the space-coded pattern projection method allows a reduction in the number of times of imaging and image transfer and in turn allows an increase in efficiency and speed of the overall processing. Further, since the same camera may be used, it is also possible to simplify the device configuration and reduce the size of the device configuration.

The disparity estimating unit may estimate the disparity based on distance information obtained based on a time of flight (TOF) method as the method different from the stereo matching. This is because the TOF allows the distance information to be obtained in a much shorter processing time than the stereo matching. Note that the TOF method may be lower in spatial resolution of distance measurement than the stereo matching method.

Provided according to another aspect of the present invention is a three-dimensional measuring system including a sensor unit including at least two cameras, and the image processing device configured to generate a depth map from an image captured from the sensor unit.

The present invention may be regarded as an image processing device including at least some of the above-described units, or may be regarded as a three-dimensional measuring system including the sensor unit and the image processing device. Further, the present invention may be regarded as image processing including at least some of the above-described processing, a three-dimensional measuring method, a distance measuring method, a control method of the image processing device, or the like, or may be regarded as a program for executing such a method or a recording medium that non-temporarily stores the program. It should be noted that the above-described units and processing may be combined with each other to an allowable degree to form the present invention.

Effect of the Invention

According to the present invention, it is possible to enable measurement processing based on stereo matching with both high accuracy and high speed.

MODE FOR CARRYING OUT THE INVENTION

Application Example

Figure 1:
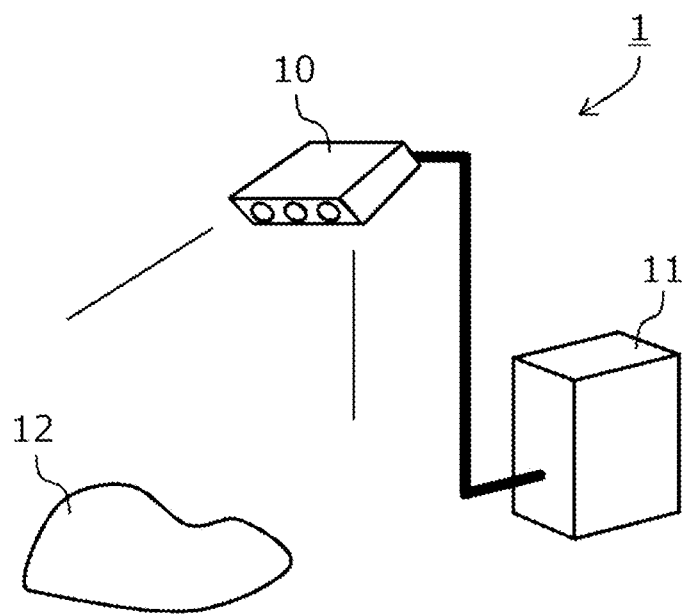
FIG. 1 is a diagram schematically showing a configuration example of a three-dimensional measuring system, which is one of application examples of the present invention.

FIG. 1 is a diagram schematically showing a configuration example of a three-dimensional measuring system, which is one of the application examples of the present invention. The three-dimensional measuring system 1 is a system that measures a three-dimensional shape of an object 12 based on image sensing, and the three-dimensional measuring system 1 primarily includes a sensor unit 10 and an image processing device 11. The sensor unit 10 includes at least a camera (also referred to as an image sensor or an imaging device) and may include another sensor as needed. The output of the sensor unit 10 is captured by the image processing device 11. The image processing device 11 is a device that performs various types of processing on the data captured from the sensor unit 10. The processing performed by the image processing device 11 may include, for example, distance measurement (ranging function), three-dimensional shape recognition, object recognition, scene recognition, or the like. A result of the processing performed by the image processing device 11 is output to an output device such as a display or transferred to the outside for inspection, control of another device, or the like. Such a three-dimensional measuring system 1 is applied to a wide range of fields, including, for example, computer vision, robot vision, and machine vision.

Note that the configuration shown in FIG. 1 is merely an example, and the hardware configuration may be suitably designed in accordance with the application of the three-dimensional measuring system 1. For example, the sensor unit 10 and the image processing device 11 may be connected by radio, or alternatively, the sensor unit 10 and the image processing device 11 may be integrated into a single device. Further, the sensor unit 10 and the image processing device 11 may be connected over a LAN or a wide area network such as the Internet. Further, a plurality of sensor units 10 may be provided for a single image processing device 11, or conversely, the output of a single sensor unit 10 may be provided to a plurality of image processing devices 11. Further, the sensor unit 10 may be attached to a robot or a mobile body to make the viewpoint of the sensor unit 10 changeable.

Figure 2:
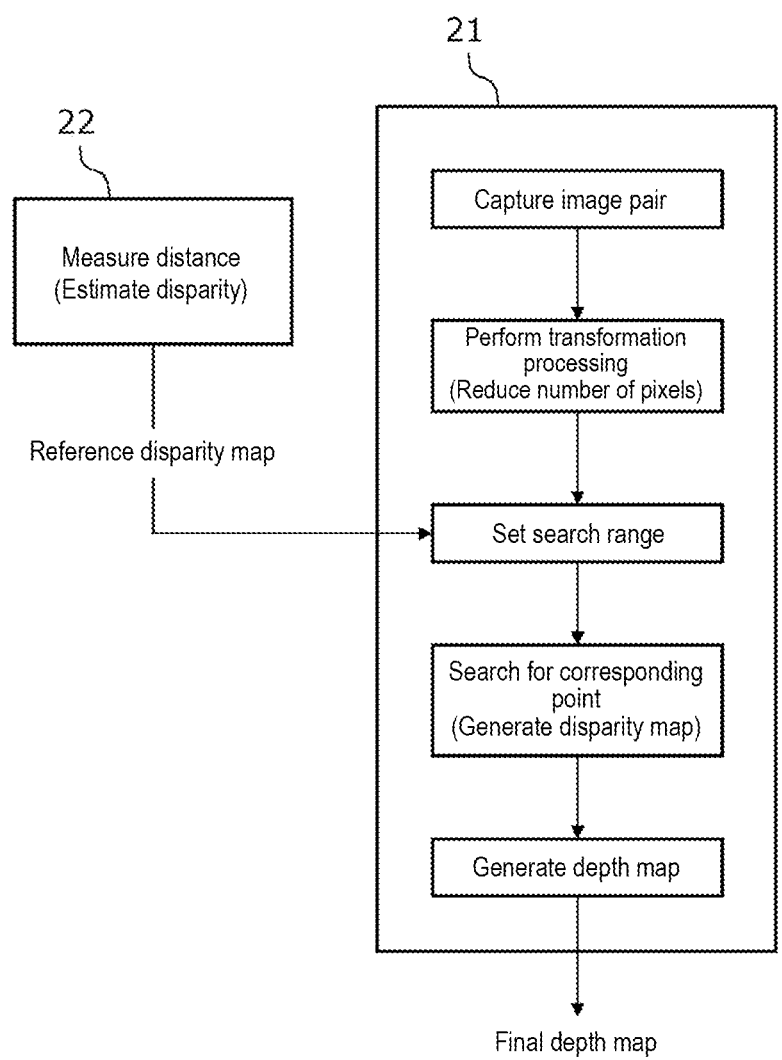
FIG. 2 is a diagram schematically showing an outline of functions of and processing performed by the three-dimensional measuring system.

FIG. 2 is a diagram schematically showing an outline of functions of and processing performed by the three-dimensional measuring system 1. The three-dimensional measuring system 1 includes two measuring systems, a first measuring system 21 and a second measuring system 22, as measuring systems for measuring a distance to the object 12. Functions of and processing performed by the measuring systems 21, 22 are implemented by the sensor unit 10 and the image processing device 11 that operate in a cooperative manner.

The first measuring system 21 measures a depth distance (depth) to the object 12 based on stereo matching (also referred to as, for example, stereo vision or stereo-camera method). Since the stereo matching enables measurement with high spatial resolution, distance information generated by the first measuring system 21 serves as a final output of the three-dimensional measuring system 1.

On the other hand, the second measuring system 22 also measures the distance to the object 12, but distance information obtained by the second measuring system 22 is used in an auxiliary manner for roughly estimating a disparity observed by the first measuring system 21 and narrowing a search range for the stereo matching. As the second measuring system 22, any measuring system may be used as long as the distance measurement is made based on a method different from the stereo matching.

The active measuring method, one of the three-dimensional measuring methods, based on the rectilinear propagation property of light includes a space-coded pattern projection method, a time-coded pattern projection method, a moire topography method (contour line method), a photometric stereo method (illumination direction/Photometric Stereo), and the like that are based on triangulation, and further includes a photometric method, a confocal laser method, a white confocal method, an optical interference method, and the like that are based on coaxial ranging. Further, the passive measuring method based on the rectilinear propagation property of light includes a volume intersection method (Shape from silhouette), a factorization method (factorization), a Depth from Motion (Structure from Motion) method, a Depth from Shading method, and the like, and further includes a Depth from focusing method, a Depth from defocus method, a Depth from zoom method, and the like that are based on coaxial ranging. Further, the active measuring method based on the speed of light include an optical time difference (TOF) measuring method, an optical phase difference (TOF) measuring method that are based on coaxial ranging, and a time-of-flight (TOF) method based on radio waves, sound waves, and millimeter waves.

Any of the above-described methods may be applied to the second measuring system 22. However, since the second measuring system 22 is configured to roughly estimate the disparity, the second measuring system 22 may be lower in measurement accuracy and spatial resolution than the stereo matching, and it is therefore preferable that a high-speed method that is shorter in measurement time than the stereo matching should be used. According to the embodiments described below, the space-coded pattern projection method is applied from the viewpoint that the measurement time is shorter, and the sensor and the image can be shared with the first measuring system 21.

Next, a description will be given of a general flow of the measurement processing performed by the three-dimensional measuring system 1 with reference to FIG. 2.

(1) The first measuring system 21 captures a stereo image pair made up of two images (referred to as a first image and a second image) from the sensor unit 10. The two images are obtained by imaging the object 12 from different viewpoints (sight line directions) so as to cause a disparity with respect to the object 12. When the sensor unit 10 includes a plurality of cameras, the first image and the second image may be concurrently taken by two cameras. Alternatively, the first image and the second image may be taken by a single camera that consecutively performs imaging while moving.

(2) The second measuring system 22 measures the distance to the object 12, estimates the disparity between the first image and the second image based on information on the distance thus obtained, and uses the disparity thus estimated as a reference disparity map. Herein, the disparity map generated by the second measuring system 22 is referred to as the "reference disparity map" in order to distinguish it from the disparity map generated by the first measuring system 21 based on the stereo matching. The reference disparity map is used in an auxiliary manner for narrowing the search range for the stereo matching in the first measuring system 21, so that the reference disparity map may be lower (coarser) in spatial resolution than the first image and the second image. Note that the reference disparity map may be generated in the image processing device 11 based on the image captured from the sensor unit 10 or different sensing data, or alternatively, when the sensor unit 10 itself has a function (such as a TOF image sensor) of measuring a distance, the reference disparity map may be generated in the sensor unit 10.

(3) The first measuring system 21 performs transformation processing on the first image and the second image to reduce the number of pixels. Here, only the number of pixels in the vertical direction (perpendicular direction) of the image (the number of horizontal lines) may be reduced, only the number of pixels in the horizontal direction (lateral direction) of the image (the number of vertical lines) may be reduced, or the number of pixels in both the vertical direction and the horizontal direction may be reduced. The transformation processing may be, for example, processing of thinning out the pixels (or lines). This is because the thinning processing is simple and fast and does not produce any artifacts that adversely affect subsequent stereo matching. A reduction ratio (thinning interval) may be set as desired. For example, when every other pixel (line) is removed, the number of pixels is reduced to a half, when two pixels (two lines) of every three pixels are removed, the number of pixels is reduced to one third, and when n pixels (n lines) of every (n+1) pixels are removed, the number of pixels is reduced to 1/(n+1). As the transformation processing, processing of reducing the resolution by interpolation may be used other than the thinning processing. As the interpolation, any method such as nearest neighbor interpolation, bilinear interpolation, or bicubic interpolation may be used. In the subsequent processing, the transformed first and second images (the first and second images having the number of pixels reduced) are used in place of the original first and second images.

(4) The first measuring system 21 sets the search range for a corresponding point based on the stereo matching using the reference disparity map obtained from the second measuring system 22. As described above, since the spatial resolution or accuracy of the reference disparity map is not so high, it is inevitable that the estimated disparity includes some error. Therefore, the search range for a corresponding point may be set so as to contain the range of the error. For example, when the value of the estimated disparity is d [pixel] and the error is ±derr [pixel], the search range may be set to a range of from d−derr−c to d+derr+c. c represents a margin. Note that the search range may be set for each of all the pixels of the first image, or when a change in local disparity in the image is not large, the first image is divided into a plurality of areas, and the search range may be set for each area.

(5) The first measuring system 21 searches the search range thus set for a corresponding point of each pixel between the first image and the second image. For example, when the first image serves as a reference image and the second image serves as a comparison image, a pixel in the second image that is most similar in image feature to a pixel (reference point) in the first image is selected as a corresponding point, and a difference in coordinates between the reference point and the corresponding point is determined to be a disparity at the reference point. The corresponding point search is performed on all the pixels in the first image, and a disparity map is generated from the results of the search. The disparity map corresponds to data containing the coordinates of each pixel and disparity information, the coordinates of each pixel and the disparity information being associated with each other.

(6) The first measuring system 21 transforms the disparity information of the disparity map into distance information (depth) based on the principle of triangulation to generate a depth map.

Since the whole comparison image is searched for a corresponding point under typical stereo matching known in the related art, it is inevitable that the processing time becomes long when a high-resolution image is used. On the other hand, the above-described configuration restricts the search range for a corresponding point based on the estimated disparity. This allows a remarkable reduction in the search range and in turn allows a significant reduction in time required for the corresponding point search. Further, since the image having the number of pixels reduced is used for stereo matching, the time required for the corresponding point search can be further reduced. Furthermore, a reduction in the number of pixels leads to a reduction in the number of data points (data amount) of the final depth map, thereby allowing reductions in both data transfer time and subsequent processing time. Such advantages are extremely effective in enabling real-time processing.

Note that, under typical stereo matching known in the related art, a simple reduction in the number of pixels of the image results in a lack of required amount of information, which may lead to a reduction in accuracy of the corresponding point search or an increase in the number of pixels from which a corresponding point cannot be found. On the other hand, according to the above-described configuration, the search range (that is, a range having a greater probability that a corresponding point exists) is narrowed based on the disparity estimated based on a method different from the stereo matching, thereby allowing an increase in processing speed while suppressing reductions in accuracy and reliability of the corresponding point search.

First Embodiment

Figure 3:
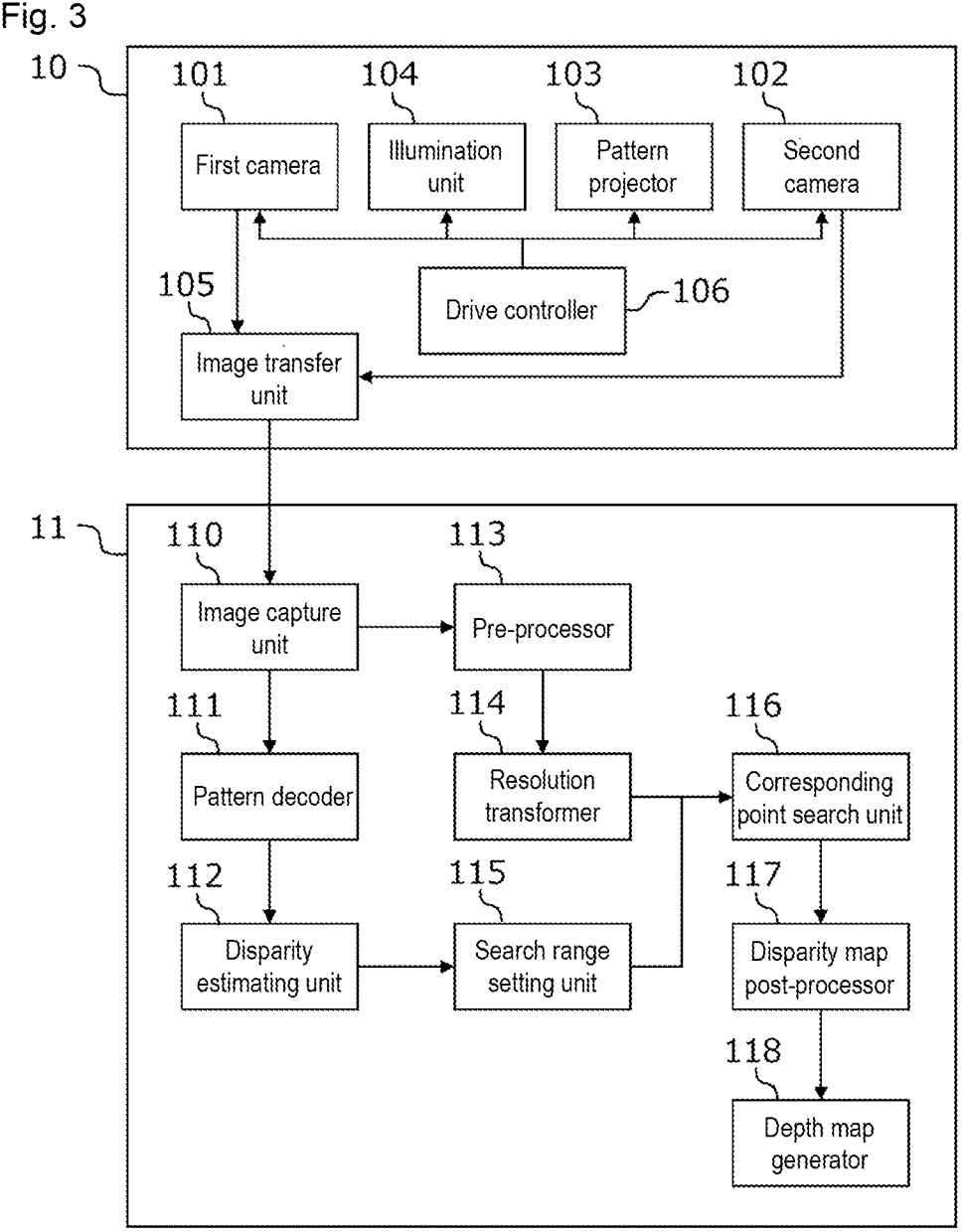
FIG. 3 is a functional block diagram of the three-dimensional measuring system according to a first embodiment.

A description will be given, with reference to FIG. 3, of a configuration example of the three-dimensional measuring system 1 according to the first embodiment. FIG. 3 is a functional block diagram of the three-dimensional measuring system 1.

(Sensor Unit)

The sensor unit 10 includes a first camera 101, a second camera 102, a pattern projector 103, an illumination unit 104, an image transfer unit 105, and a drive controller 106.

The first camera 101 and the second camera 102 are a pair of cameras serving as a so-called stereo camera and are arranged at a predetermined distance from each other. Concurrent imaging by the two cameras 101, 102 makes it possible to obtain an image pair taken from different viewpoints (the image taken by the first camera 101 is referred to as the first image, and an image taken by the second camera 102 is referred to as the second image). The two cameras 101, 102 may be arranged such that their optical axes intersect each other, and their horizontal lines (or vertical lines) are flat on the same plane. Such an arrangement makes the epipolar line parallel to the horizontal lines (or vertical lines) of the images, so that the corresponding point can be searched for within the same horizontal lines (or vertical lines) based on the stereo matching, and the search processing can be simplified accordingly. Note that as the cameras 101, 102, either a monochrome camera or a color camera may be used.

The pattern projector 103 is a device, also referred to as a projector, that projects, onto the object 12, pattern illumination for use in distance measurement based on the space-coded pattern projection method. The pattern projector 103 includes, for example, a light source, a light guide lens, a pattern generator, a projection lens, and the like. As the light source, an LED, a laser, a vertical cavity surface-emitting laser (VCSEL), or the like may be used. The light guide lens is an optical element that guides light from the light source to the pattern generator, and the light guide lens may be a lens, a glass rod, or the like. The pattern generator is a member or device that generates a coded pattern, and the pattern generator may be a photomask, a diffractive optical element (for example, diffractive optical element (DOE)), an optical modulation element (for example, digital light processing (DLP), liquid crystal display (LCD), liquid crystal on silicon (LCoS), or micro electro mechanical systems (MEMS)), or the like. The projection lens is an optical element that magnifies and projects a generated pattern.

The illumination unit 104 is uniform illumination used for taking a general visible light image. For example, white LED illumination is used. Alternatively, illumination identical in wavelength band to the active projection may be used.

The image transfer unit 105 transfers data of the first image taken by the first camera 101 and data of the second image taken by the second camera 102 to the image processing device 11. The image transfer unit 105 may transfer the first image and the second image as separate image data, or may connect the first image and the second image to generate a side-by-side image and transfer the side-by-side image as single image data. The drive controller 106 is a unit that controls the first camera 101, the second camera 102, the pattern projector 103, and the illumination unit 104. Note that the image transfer unit 105 and the drive controller 106 may be provided in the image processing device 11 rather than in the sensor unit 10.

(Image Processing Device)

The image processing device 11 includes an image capture unit 110, a pattern decoder 111, a disparity estimating unit 112, a pre-processor 113, a resolution transformer 114, a search range setting unit 115, a corresponding point search unit 116, a disparity map post-processor 117, and a depth map generator 118.

The image capture unit 110 has a function of capturing necessary image data from the sensor unit 10. The image capture unit 110 sends the first image to the pattern decoder 111, and sends the stereo image pair made up of the first image and the second image to the pre-processor 113.

The pattern decoder 111 has a function of extracting distance information from the first image based on the space-coded pattern projection method. Under the space-coded pattern projection method, the spatial resolution is determined in a manner that depends on the size of a unit pattern used. For example, when a unit pattern of 5 pixels×5 pixels is used, the spatial resolution of the distance information results in ¹⁄₂₅ of the input image. The disparity estimating unit 112 has a function of estimating a disparity between the first image and the second image based on the distance information extracted by the pattern decoder 111 and outputting a reference disparity map.

The pre-processor 113 has a function of performing necessary preprocessing on the first image and the second image. The resolution transformer 114 has a function of performing transformation processing on the first image and the second image to reduce the number of pixels. The search range setting unit 115 has a function of setting a search range for a corresponding point based on the disparity thus estimated. The corresponding point search unit 116 has a function of searching for a corresponding point between the first image and the second image and generating a disparity map based on a result of the search. The disparity map post-processor 117 has a function of performing necessary postprocessing on the disparity map. The depth map generator 118 has a function of transforming the disparity information of the disparity map into the distance information and generating a depth map.

The image processing device 11 is, for example, a computer including a CPU (processor), a RAM (memory), a non-volatile storage device (hard disk, SSD, etc.), an input device, an output device, and the like. Such a configuration causes the CPU to load a program stored in the non-volatile storage device into the RAM and execute the program to implement the various functions described above. However, the configuration of the image processing device 11 is not limited to the above-described configuration, and all or some of the above-described functions may be implemented by an application specific circuit such as FPGA or ASIC, or may be implemented by cloud computing or distributed computing.

According to this example, the first camera 101, the pattern projector 103, the image transfer unit 105, the image capture unit 110, the drive controller 106, the pattern decoder 111, and the disparity estimating unit 112 make up the second measuring system 22 shown in FIG. 2, and the first camera 101, the second camera 102, the pattern projector 103, the image transfer unit 105, the drive controller 106, the pre-processor 113, the resolution transformer 114, the search range setting unit 115, the corresponding point search unit 116, the disparity map post-processor 117, the depth map generator 118 make up the first measuring system 21 shown in FIG. 2.

(Measurement Processing)

Figure 4:
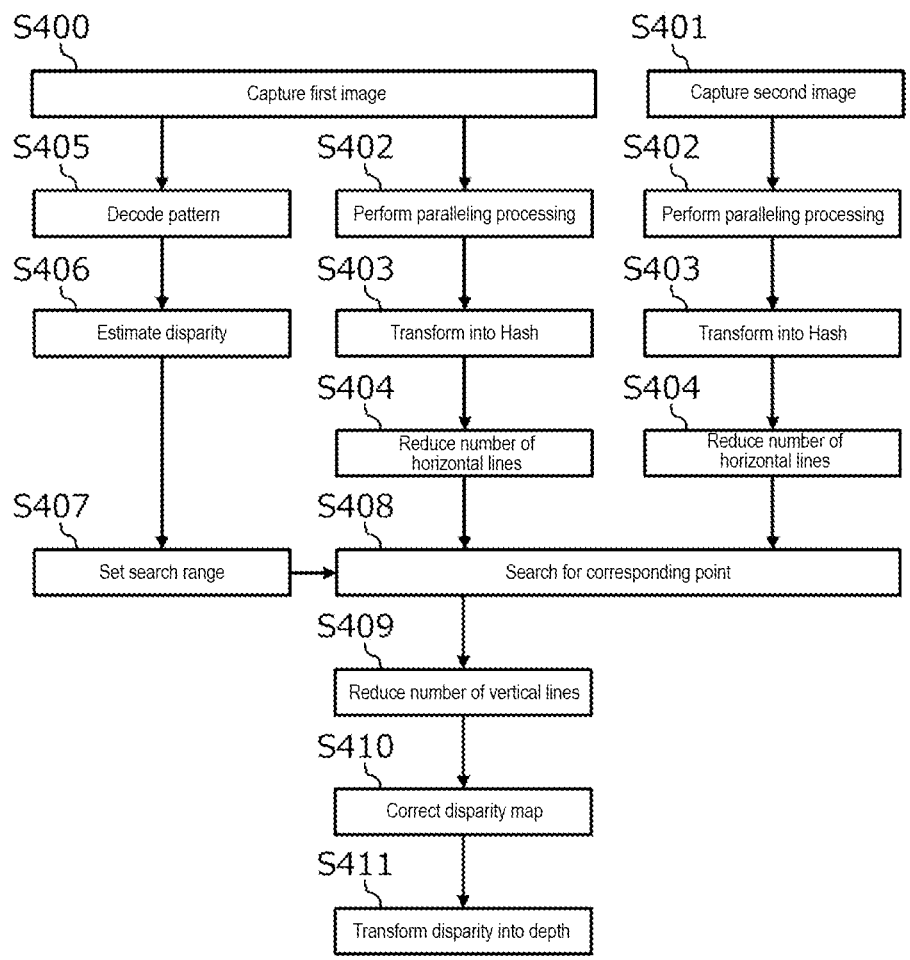
FIG. 4 is a flowchart showing a flow of measurement processing according to the first embodiment.

A description will be given of a flow of measurement processing according to the first embodiment with reference to FIG. 4. FIG. 4 is a flowchart showing a flow of processing performed by the image processing device 11.

In steps S400, S401, the image capture unit 110 captures the first image and the second image from the sensor unit 10. The first image and the second image are images taken by the first camera 101 and the second camera 102, respectively, in a state where the pattern illumination is projected from the pattern projector 103 onto the object 12. When data in the side-by-side image format is captured from the sensor unit 10, the image capture unit 110 divides the side-by-side image into the first image and the second image. The image capture unit 110 sends the first image to the pattern decoder 111 and sends the first image and the second image to the pre-processor 113.

In step S402, the pre-processor 113 performs paralleling processing (rectification) on the first image and the second image. The paralleling processing is processing of geometrically transforming either or both of two images such that corresponding points between the two images are on the same horizontal line (or vertical line) of the images. The paralleling processing makes the epipolar line parallel to the horizontal lines (or vertical lines) of the images, thereby making the subsequent corresponding point search processing simple. Note that when the parallelism between the images captured from the sensor unit 10 is sufficiently high, the paralleling processing in step S402 need not be performed.

In step S403, the pre-processor 113 calculates a hash feature value for each pixel of the first image and the second image made parallel to each other, and replaces the value of each pixel with the hash feature value. The hash feature value represents a luminance feature in a local region centered on a pixel of interest, and the hash feature value used here is a bit string of eight elements. As described above, transforming luminance values of each image into the hash feature values significantly increases efficiency of similarity calculation of the local luminance feature in the subsequent corresponding point search.

In step S404, the resolution transformer 114 performs resolution transformation processing on both the first image and the second image. According to the embodiment, every other image horizontal line is removed to reduce the number of pixels in the vertical direction of each image to a half. When the epipolar line is parallel to the horizontal direction of the images, removing only the number of pixels in the vertical direction and leaving image information in the horizontal direction as in the embodiment allows the accuracy and reliability of the corresponding point search to be maintained.

In step S405, the pattern decoder 111 analyzes the original first image and decodes the pattern to obtain distance information in the depth direction on a plurality of points on the first image.

In step S406, the disparity estimating unit 112 calculates, based on the distance information on each point obtained in step S405, two-dimensional coordinates when each point is projected onto an image coordinate system of the first image and two-dimensional coordinates when the same point is projected onto an image coordinate system of the second image, the first image and the second image being made parallel to each other, and calculates a difference in coordinates between the first image and the second image. This difference corresponds to the estimated disparity. The disparity estimating unit 112 obtains the estimated disparity for all the points on which the distance information has been obtained in step S405, and outputs the data as the reference disparity map.

In step S407, the search range setting unit 115 sets, based on the estimated disparity, the search range for a corresponding point for the first image and the second image both having the number of pixels reduced. The size of the search range is determined in consideration of estimation error. For example, when the estimation error is ±10 pixels, setting the search range to about ±20 pixels, including a margin, centered on the estimated disparity is considered sufficient. Assuming that each horizontal line has 640 pixels and the search range can be narrowed to ±20 pixels (that is, 40 pixels), the search processing can be simply reduced to 1/16 compared to searching the whole horizontal line.

In step S408, the corresponding point search unit 116 searches for a corresponding point between the first image and the second image both having the number of pixels reduced and obtains a disparity in each pixel. The corresponding point search unit 116 generates disparity data containing the disparity information and a point (pixel coordinates) where the corresponding point has been successfully detected, the disparity information and the point being associated with each other. This information corresponds to the disparity map.

In step S409, the disparity map post-processor 117 performs resolution transformation processing on the disparity map. According to the embodiment, every other vertical line of the disparity map is removed to reduce the number of pixels in the horizontal direction of the disparity map to a half.

In step S410, the disparity map post-processor 117 corrects the disparity map. The disparity map estimated by the corresponding point search contains erroneously measured points, missing measurement, and the like, so that correction of the erroneously measured points and compensation for the missing measurement are made based on disparity information on surrounding pixels. Note that either step S409 or step S410 may be performed first.

In step S411, the depth map generator 118 transforms the disparity information on each pixel of the disparity map into three-dimensional information (distance information in the depth direction) to generate a depth map. This depth map (three-dimensional point group data) is used, for example, for shape recognition or object recognition of the object 12.

The configuration and processing according to the first embodiment described above allows a significant reduction in time required for the corresponding point search as compared with the typical stereo matching known in the related art. This further allows a reduction in the number of data points (data volume) of the depth map that is a result of the stereo matching, thereby producing an effect of reducing the data transfer time and reducing the subsequent recognition processing time. Further, according to the embodiment, only the number of pixels in the direction orthogonal to the epipolar line is reduced before the corresponding point search, and the amount of information in the direction parallel to the epipolar line is maintained, thereby allowing an increase in processing speed without deteriorating the accuracy and the reliability of the corresponding point search.

Figure 5:
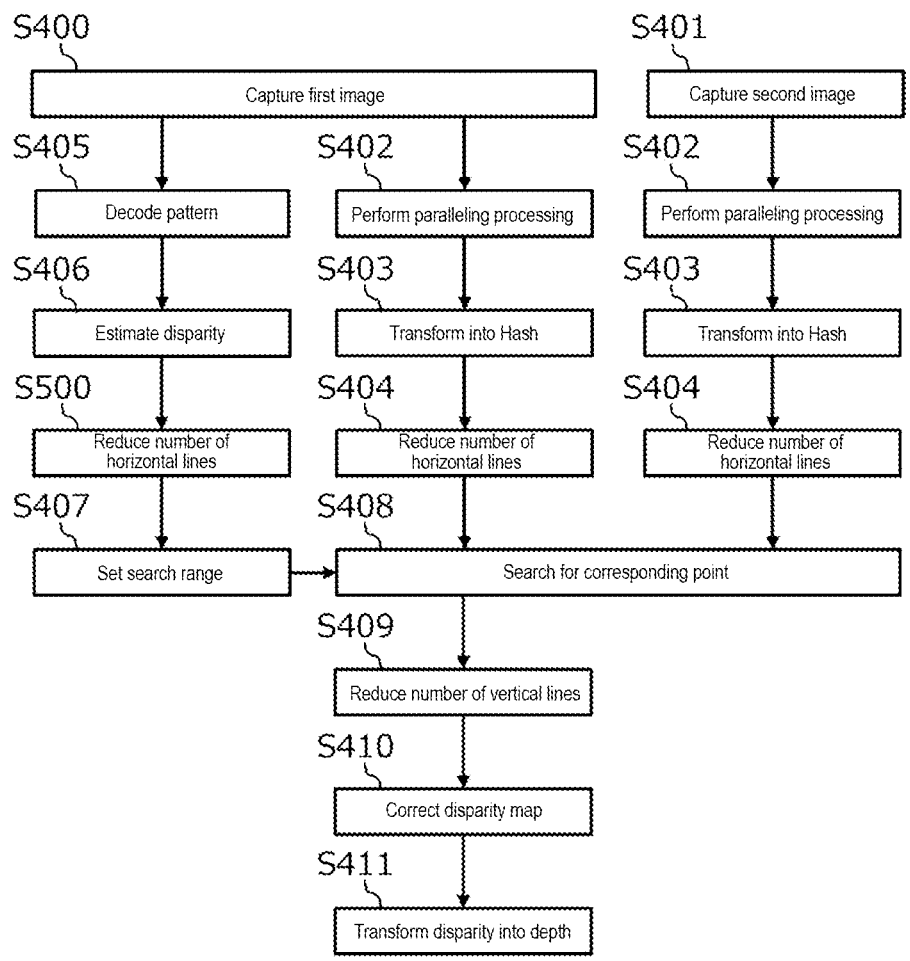
FIG. 5 is a flowchart showing a modification of the measurement processing according to the first embodiment.

FIG. 5 shows a modification of the measurement processing according to the first embodiment. In this modification, processing of reducing the number of horizontal lines of the reference disparity map (step S500) is added after step S406. This allows a reduction in processing time required for setting the search range (step S407) and in turn allows a further increase in speed of the overall measurement processing. Note that step S500 may be performed before step S406.

Second Embodiment

Figure 6:
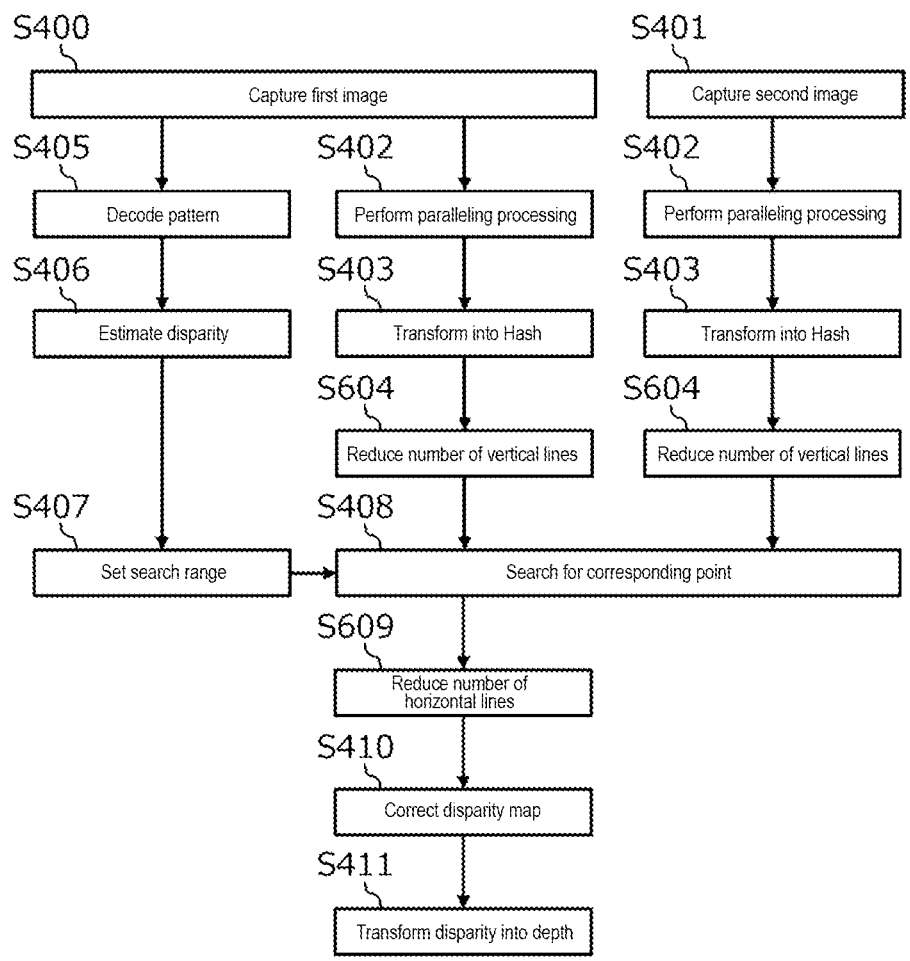
FIG. 6 is a flowchart showing a flow of measurement processing according to a second embodiment.

FIG. 6 is a flowchart showing a flow of measurement processing according to a second embodiment. According to the first embodiment, the number of horizontal lines is reduced before the corresponding point search, and the number of vertical lines of the disparity map is reduced after the corresponding point search, whereas according to the second embodiment, the number of vertical lines is reduced (step S604) before the corresponding point search, and the number of horizontal lines of the disparity map is reduced (step S609) after the corresponding point search. The other processing is the same as in the first embodiment; therefore, the same reference numerals as in FIG. 4 will be assigned to the other processing, and no description will be given of the other processing.

The configuration and processing according to the embodiment can produce the same effects as in the first embodiment. The processing according to the embodiment allows the corresponding point search to be performed while maintaining the amount of information in the vertical direction, so that the processing is suitable when, for example, the first camera and the second camera are arranged parallel to the vertical lines to make the epipolar line parallel to the vertical lines.

Figure 7:
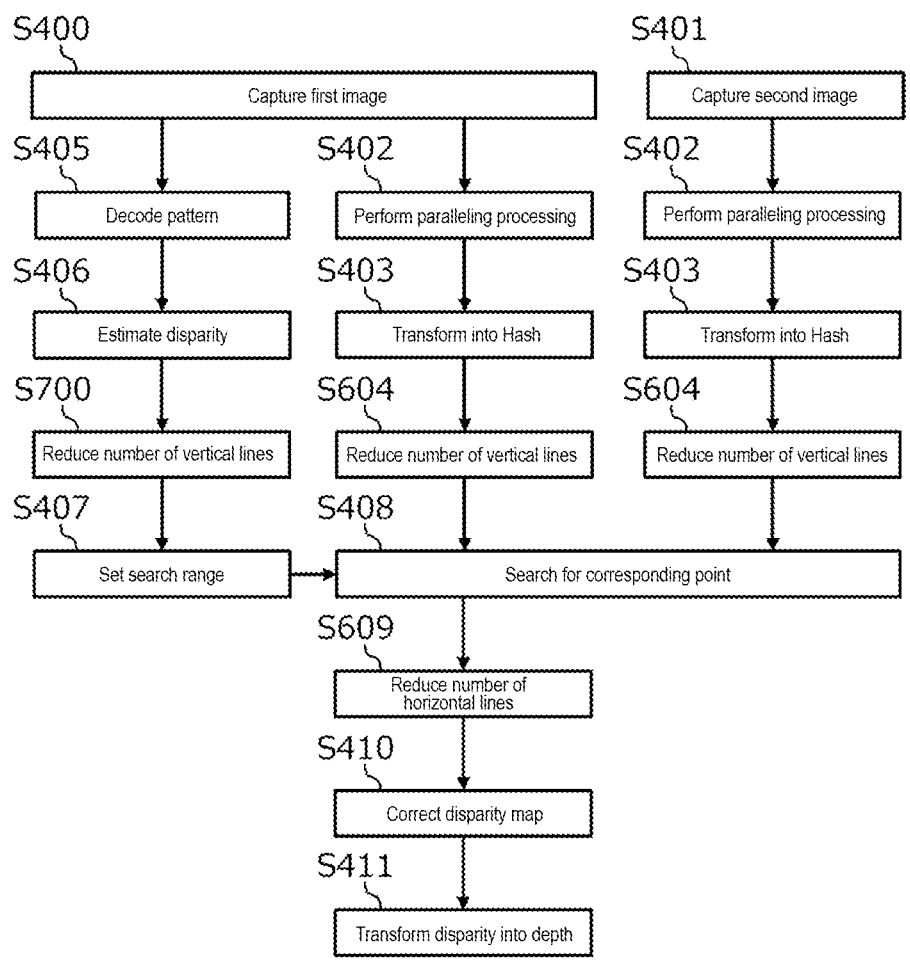
FIG. 7 is a flowchart showing a modification of the measurement processing according to the second embodiment.

FIG. 7 shows a modification of the measurement processing according to the second embodiment. In this modification, processing of reducing the number of horizontal lines of the reference disparity map (step S700) is added after step S406. This allows a reduction in processing time required for setting the search range (step S407) and in turn allows a further increase in speed of the overall measurement processing. Note that step S700 may be performed before step S406.

Third Embodiment

Figure 8:
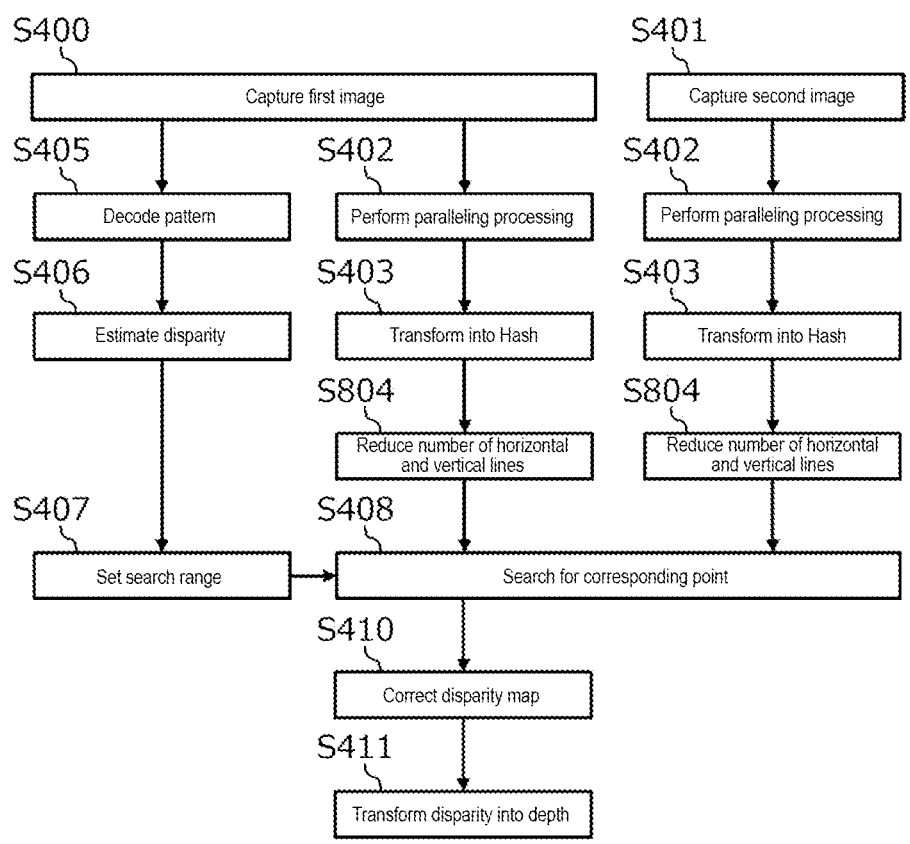
FIG. 8 is a flowchart showing a flow of measurement processing according to a third embodiment.

FIG. 8 is a flowchart showing a flow of measurement processing according to a third embodiment. According to the first and second embodiments, the number of horizontal lines or vertical lines is reduced before the corresponding point search, and then the number of the other lines is reduced after the corresponding point search, whereas according to the third embodiment, the number of both horizontal lines and vertical lines is reduced (step S804) before the corresponding point search. The other processing is the same as in the first embodiment; therefore, the same reference numerals as in FIG. 4 will be assigned to the other processing, and no description will be given of the other processing.

The configuration and processing according to the embodiment can produce the same actions and effects as in the first embodiment. The processing according to the embodiment may slightly lower in accuracy and reliability of the corresponding point search than the processing according to the first and second embodiments, but the processing according to the embodiment can be made shorter in processing time required for the corresponding point search than the processing according to the first and second embodiments.

Figure 9:
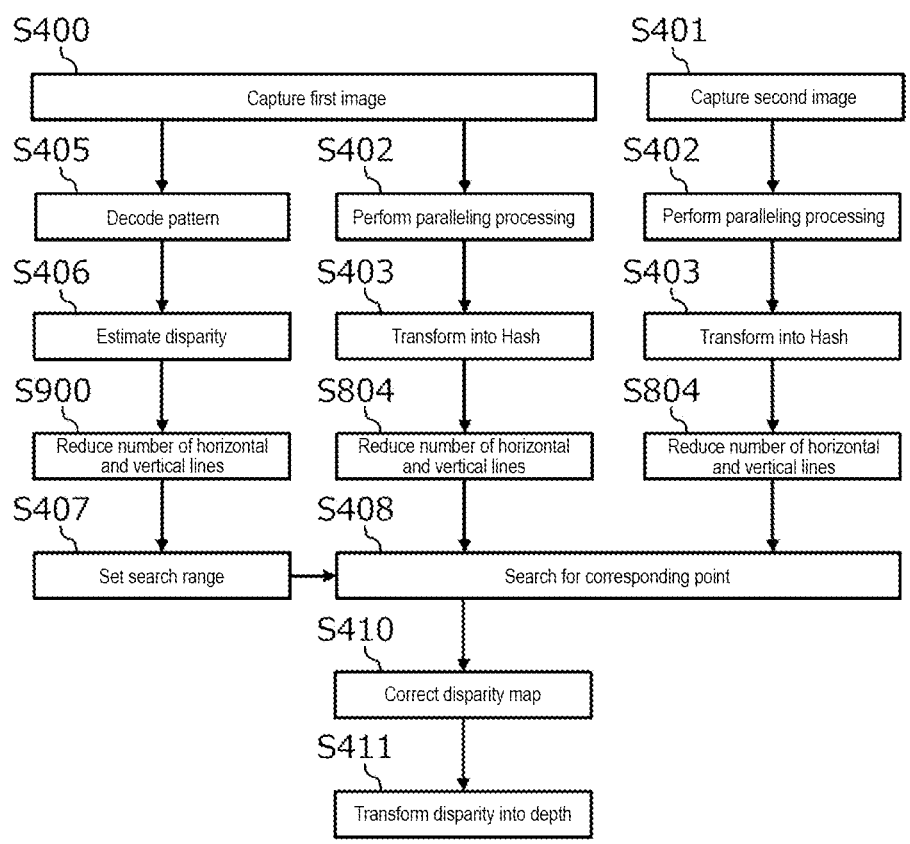
FIG. 9 is a flowchart showing a modification of the measurement processing according to the third embodiment.

FIG. 9 shows a modification of the measurement processing according to the third embodiment. In this modification, processing of reducing the number of horizontal lines and vertical lines of the reference disparity map (step S900) is added after step S406. This allows a reduction in processing time required for setting the search range (step S407) and in turn allows a further increase in speed of the overall measurement processing. Note that step S900 may be performed before step S406.

Fourth Embodiment

Figure 10:
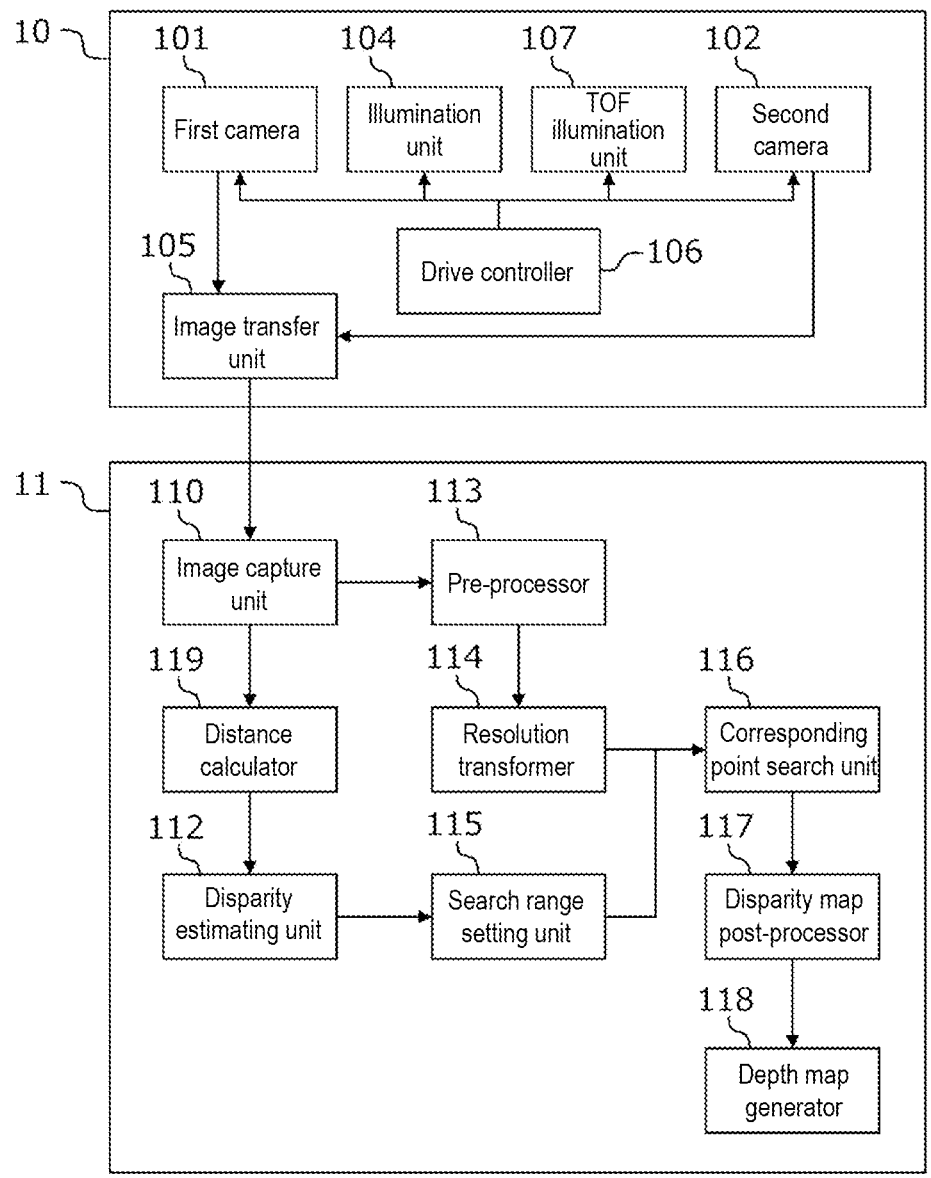
FIG. 10 is a functional block diagram of a three-dimensional measuring system according to a fourth embodiment.
Figure 11:
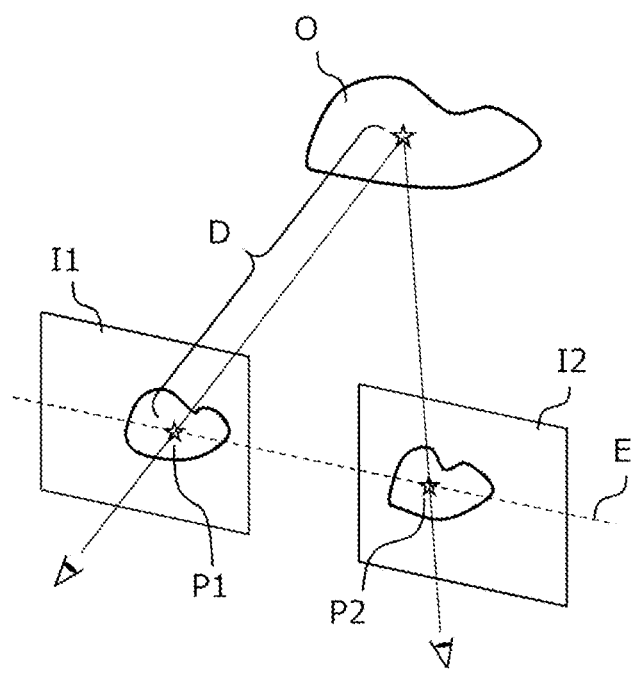
FIG. 11 is a diagram for describing the principle of stereo matching.

FIG. 10 shows a configuration example of a three-dimensional measuring system according to a fourth embodiment. According to the first to third embodiments, the space-coded pattern projection method is used to obtain the reference disparity map, whereas according to the embodiment, the TOF method is used. Specifically, in the sensor unit 10, a TOF illumination unit 107 is provided in place of the pattern projector 103, and in the image processing device 11, a distance calculator 119 is provided in place of the pattern decoder 111.

The TOF method is roughly divided into an optical time difference measuring method and an optical phase difference measuring method. The optical time difference measuring method is a method for directly detecting an arrival time of photons to calculate a distance with a time to digital converter (TDC). Under the optical time difference measuring method, a light source that emits pulsed light is used as the TOF illumination unit 107. On the other hand, the optical phase difference measuring method is a method for periodically modulating intensity of photons to calculate a distance from an optical phase difference. Under the optical phase difference measuring method, a light source capable of periodically modulating luminance is used as the TOF illumination unit 107. The distance calculator 119 calculates the distance to the object from the arrival time or the phase difference.

Under a typical TOF method, it is necessary to superimpose a plurality of distance images in the time direction in order to make the measured value robust. However, according to the embodiment, the result of distance measurement based on the TOF method is used for roughly estimating the disparity, and strict accuracy is not required; therefore, it is sufficient to obtain one distance image (or a small number of distance images). That is, a combination of the TOF method and the stereo matching method allows an increase in speed of the stereo matching method while suppressing a reduction in robustness.

Regarding the flow of the measurement processing, the pattern decoding processing (step S405) in the measurement processing (FIGS. 4 to 9) according to the above-described embodiments is replaced with the distance calculation processing performed by the distance calculator 119, and the other processing may be the same as according to the above-described embodiments.

<Others>

The above-described embodiments are merely illustrative of a configuration example according to the present invention. The present invention is not limited to the above-described specific forms, and various modifications may be made within the scope of the technical idea of the present invention. For example, according to the above-described embodiments, the space-coded pattern projection method and the TOF method have been given as examples, but any method other than the stereo matching may be employed as the distance measuring method of the second measuring system. Further, according to the above-described embodiments, the hash feature value is used for the stereo matching, but another method may be used for evaluating the similarity in corresponding point. For example, there is a method for calculating the similarity between pixels of left and right images based on sum of absolute difference (SAD), sum of squared difference (SSD), normalized correlation (NC), or the like as an evaluation index of similarity. Further, according to the above-described embodiments, the camera image common to the generation of the reference depth map (disparity estimation) and the stereo matching is used, but different camera images for three-dimensional measurement may be used.

<Appendix>

(1) An image processing device (11) configured to generate a depth map based on stereo matching using an image pair, the depth map corresponding to data containing coordinates of each pixel and distance information, the coordinates of each pixel and the distance information being associated with each other, the image processing device including:

an image capture unit (110) configured to capture a first image and a second image, the first image and the second image being taken from different viewpoints;

a disparity estimating unit (112) configured to estimate a disparity between the first image and the second image based on a method different from the stereo matching;

a transforming unit (114) configured to perform transformation processing on both the first image and the second image to reduce a number of pixels in a horizontal direction and/or a vertical direction; a setting unit (115) configured to set, based on the disparity estimated, a search range for a corresponding point for the stereo matching;

a disparity map generating unit (116) configured to search only the search range set for a corresponding point of each pixel between the first image subjected to the transformation processing and the second image subjected to the transformation processing and generate a disparity map based on a result of the search, the disparity map corresponding to data containing the coordinates of each pixel and disparity information, the coordinates of each pixel and the disparity information being associated with each other; and a depth map generating unit (118) configured to transform the disparity information of the disparity map into the distance information and generate the depth map.

DESCRIPTION OF SYMBOLS 1 three-dimensional measuring system
10 sensor unit
11 image processing device
12 object
21 first measuring system
22 second measuring system

The invention claimed is:

1. An image processing device configured to generate a depth map based on stereo matching using an image pair, the depth map corresponding to data containing coordinates of each pixel and distance information, the coordinates of each pixel and the distance information being associated with each other, the image processing device comprising:
   an image capture unit configured to capture the image pair made up of a first image and a second image, the first image and the second image being taken from different viewpoints;
   a disparity estimating unit configured to estimate a disparity between the first image and the second image based on a method different from the stereo matching;
   a transforming unit configured to perform transformation processing on both the first image and the second image to reduce a number of pixels in a horizontal direction and/or a vertical direction;
   a setting unit configured to set, based on the disparity estimated, a search range for a corresponding point for the stereo matching;
   a disparity map generating unit configured to search only the search range set for a corresponding point of each pixel between the first image subjected to the transformation processing and the second image subjected to the transformation processing and generate a disparity map based on a result of the search, the disparity map corresponding to data containing the coordinates of each pixel and disparity information, the coordinates of each pixel and the disparity information being associated with each other; and
   a depth map generating unit configured to transform the disparity information of the disparity map into the distance information and generate the depth map,
   wherein the transforming unit performs the transformation processing on both the first image and the second image to reduce the number of pixels in one direction of the horizontal direction or the vertical direction, wherein the one direction is orthogonal to an epipolar line.

2. The image processing device according to claim 1, further comprising a second transforming unit configured to perform second transformation processing on the disparity map generated by the disparity map generating unit to reduce the number of pixels in the horizontal direction or the vertical direction, wherein,
   the second transforming unit performs the second transformation processing on the disparity map to reduce the number of pixels in a direction different from the one direction applied to the transformation processing, and
   the depth map generating unit generates the depth map from the disparity map subjected to the second transformation processing.

3. The image processing device according to claim 1, wherein the transformation processing is processing of pixel thinning.

4. The image processing device according to claim 1, wherein
   the disparity estimating unit estimates the disparity based on distance information obtained based on a space-coded pattern projection method.

5. The image processing device according to claim 4, wherein
   the first image and the second image are taken by imaging projected pattern illumination for the space-coded pattern projection method, and
   the disparity estimating unit estimates the disparity based on the distance information obtained based on the space-coded pattern projection method using the first image or the second image.

6. The image processing device according to claim 1, wherein
   the disparity estimating unit estimates the disparity based on distance information obtained based on a time of flight (TOF) method.

7. A three-dimensional measuring system comprising:
   a sensor unit comprising at least two cameras; and
   the image processing device according to claim 1, the image processing device being configured to generate a depth map from an image captured from the sensor unit.

8. A non-transitory computer readable medium storing a program causing a computer to function as each unit of the image processing device according to claim 1.

9. An image processing method for generating a depth map based on stereo matching using an image pair, the depth map corresponding to data containing coordinates of each pixel and distance information, the coordinates of each pixel and the distance information being associated with each other, the image processing method comprising:
   capturing a first image and a second image, the first image and the second image being taken from different viewpoints;
   estimating a disparity between the first image and the second image based on a method different from the stereo matching;
   performing transformation processing on both the first image and the second image to reduce a number of pixels in a horizontal direction and/or a vertical direction;
   setting, based on the disparity estimated, a search range for a corresponding point for the stereo matching;
   searching only the search range set for a corresponding point of each pixel between the first image subjected to the transformation processing and the second image subjected to the transformation processing and generating a disparity map based on a result of the search, the disparity map corresponding to data containing the coordinates of each pixel and disparity information, the coordinates of each pixel and the disparity information being associated with each other; and transforming the disparity information of the disparity map into the distance information and generating the depth map, wherein the transformation processing is performed on both the first image and the second image to reduce the number of pixels in one direction of the horizontal direction or the vertical direction, wherein the one direction is orthogonal to an epipolar line.

* * * * *